Dec. 18, 1923.  1,477,657
W. MEYER
METHOD OF MOUNTING BRACKETS AND THE LIKE ON TUBES
Filed March 7, 1921
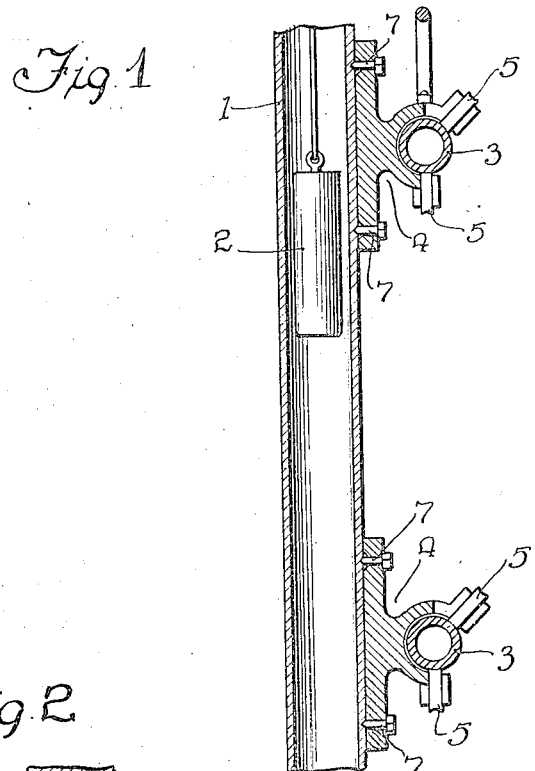
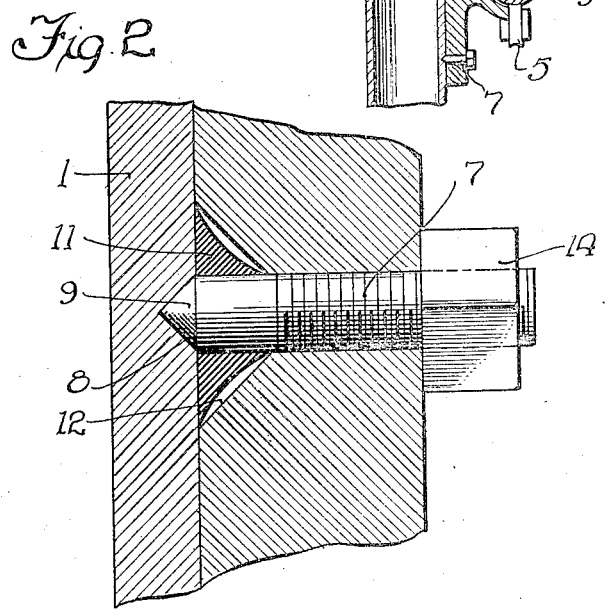
Inventor
William Meyer
By [signature]
Att'ys Patented Dec. 18, 1923.

1,477,657

UNITED STATES PATENT OFFICE.

WILLIAM MEYER, OF CHICAGO, ILLINOIS.

METHOD OF MOUNTING BRACKETS AND THE LIKE ON TUBES.

Original application filed April 12, 1918, Serial No. 228,104. Divided and this application filed March 7, 1921. Serial No. 450,469.

*To all whom it may concern:*

Be it known that I, WILLIAM MEYER, a citizen of the United States, residing at Chicago, in the county of Cook and State of Illinois, have invented a certain new and useful Improvement in Methods of Mounting Brackets and the like on Tubes, of which the following is a full, clear, concise, and exact description, reference being had to the accompanying drawings, forming a part of this specification.

The present invention relates to a method of mounting brackets or other members on tubes and the like, and is divisional of my co-pending application, Serial No. 228,104, filed April 12, 1918.

In the aforesaid co-pending application I have disclosed an improved X-ray stand and table embodying in its construction a vertical X-ray standard which is supported on two horizontal rails along which the vertical standard is adapted to have rolling motion. This rolling motion is accommodated by the provision of brackets on the standard carrying small rollers which bear at different points about the horizontal rails so as to afford an easy rolling mounting of the standard on these rails. It is with the manner of mounting these brackets upon the vertical tubular standard and with analogous situations that the present invention is primarily concerned. For lightness and cheapness of construction the vertical standards of these X-ray stands are generally constructed of light weight tubing having insufficient sectional thickness to adapt them to any screw threaded mounting of studs or bolts for securing the brackets to the standard. Moreover, owing to the presence of a reciprocating counterweight in the center of the standard for counterbalancing the X-ray tube, any manner of mounting the brackets which involves any protuberance or pentrating members projecting into the interior of the tube is prohibited. Accordingly, I have adopted the practice of welding studs to the wall of the tubular standard for mounting these brackets. It is essential that these studs be accurately spotted or centered for accurate registration with their corresponding openings in the mounting brackets so that these brackets will properly register with the horizontal rails. The present invention involves an improved manner of accurately spotting or centering these studs along the tubular standard, whereby there is no possibility of the stud shifting out of alignment with its predetermined center during the welding operation. The invention also involves a novel relation between the welding fillet around the base of the stud, and the bracket or other member, whereby the bracket can be clamped flush against the wall of the tube without interference with the welding fillet.

Although I shall describe my invention as particularly adapted for mounting the guide brackets on X-ray tube standards, it is to be understood that the utility of the invention is not confined to the mounting of brackets, studs, or other stationary members solely to tubes, but also has application to the mounting of such members to plates and various other metallic surfaces. In the accompanying drawings:

Figure 1 illustrates the vertical standard or tube and the mounting brackets in longitudinal section; and Figure 2 is an enlarged detail sectional view illustrating the manner of welding the studs to the tube and of clamping the brackets to the studs.

The tube designated 1 is representative of any tube of weldable metal having comparatively thin walls. In the co-pending application above referred to, this tube constituted a supporting standard for an X-ray tube frame, and reciprocating in the tube 1 was a counterweight 2 for counterbalancing the weight of the X-ray tube and frame (not shown). The standard 1 was supported for rolling motion along two horizontal rails 3—3 of circular section, which were embraced by mounting brackets 4—4. Rollers 5 pivotally mounted in the brackets 4 were arranged to bear at different points about the rails 3 so as to support the standard 1 for free rolling motion along these rails.

Referring now to the manner of mounting the brackets 4 on the standard 1, the relatively thin walls of the standard or tube 1 and the presence of the reciprocating counterweight 2 make it particularly desirable that the studs or other members for mounting the brackets to the tube be welded to the tube for giving the requisite strength and rigidity. The guide rails 3 have a definite spacing and accordingly it is essential that the mounting studs 7 be welded at accurately predetermined points along the tube 1 in order that the brackets mounted thereon shall accurately register with the guide rails 3. Accordingly, as a first step, the tube 1 is drilled at these predetermined points, as indicated at 8. These drilled holes are preferably in the form of conical recesses for receiving and accurately centering the conical ends 9 of the studs 7. After each stud has been centered in this manner, it can be conveniently held against any shifting during the welding operation. The weld is performed by heating the stud 7 and the adjacent portion of the tube 1 and flowing a welding fillet 11 around the base of the stud 7, so that the stud, the tube and the fillet are all fused together. It is during the flowing of this fillet and during the working and manipulation of the metal that the tendency to displace the stud arises; which in the present instance is of course prevented by the restraining action of the centering recess, the stud being forcibly held in this recess. The weld is performed with an electric current or an oxyacetylene flame, the heat applied to the tube 1 and to the stud 7 also operating to produce an autogenous weld between the conical end 9 of the stud and the conical recess 8 of the tube. The fillet 11 is preferably coned or tapered outwardly along the shank of the stud 7 for securing extensive fusion area with the stud and with the wall of the tube. In order that the bracket 4 may be drawn up flush against the wall of the tube 1 the reverse side of the bracket is formed with a conical depression 12 for receiving the flared fillet 11. After all of the studs are centered and welded in the above described manner, the brackets 4—4 are slipped over the ends of the studs and are securely clamped to the tube 1 by nuts 14 threading over the ends of the studs.

I claim:

1. In combination, a metallic wall having a centering recess formed therein, a stud centered in said recess, a welding fillet joining said wall with said stud, a member engaging over said stud, said member being relieved on its reverse side to accommodate said welding fillet.

2. In combination, a tube having a centering recess drilled into the wall of said tube, a stud having its end corresponding in formation to said recess and centered in said recess, a tapering welding fillet joining the inner end of said stud with said tube, a stationary member clamped over the end of said stud, said member having a tapering depression in its reverse side for receiving said tapering fillet and permitting said member to be clamped against the wall of said tube.

In witness whereof, I hereunto subscribe my name this 1st day of March, 1921.

WILLIAM MEYER.